Patented Mar. 14, 1950

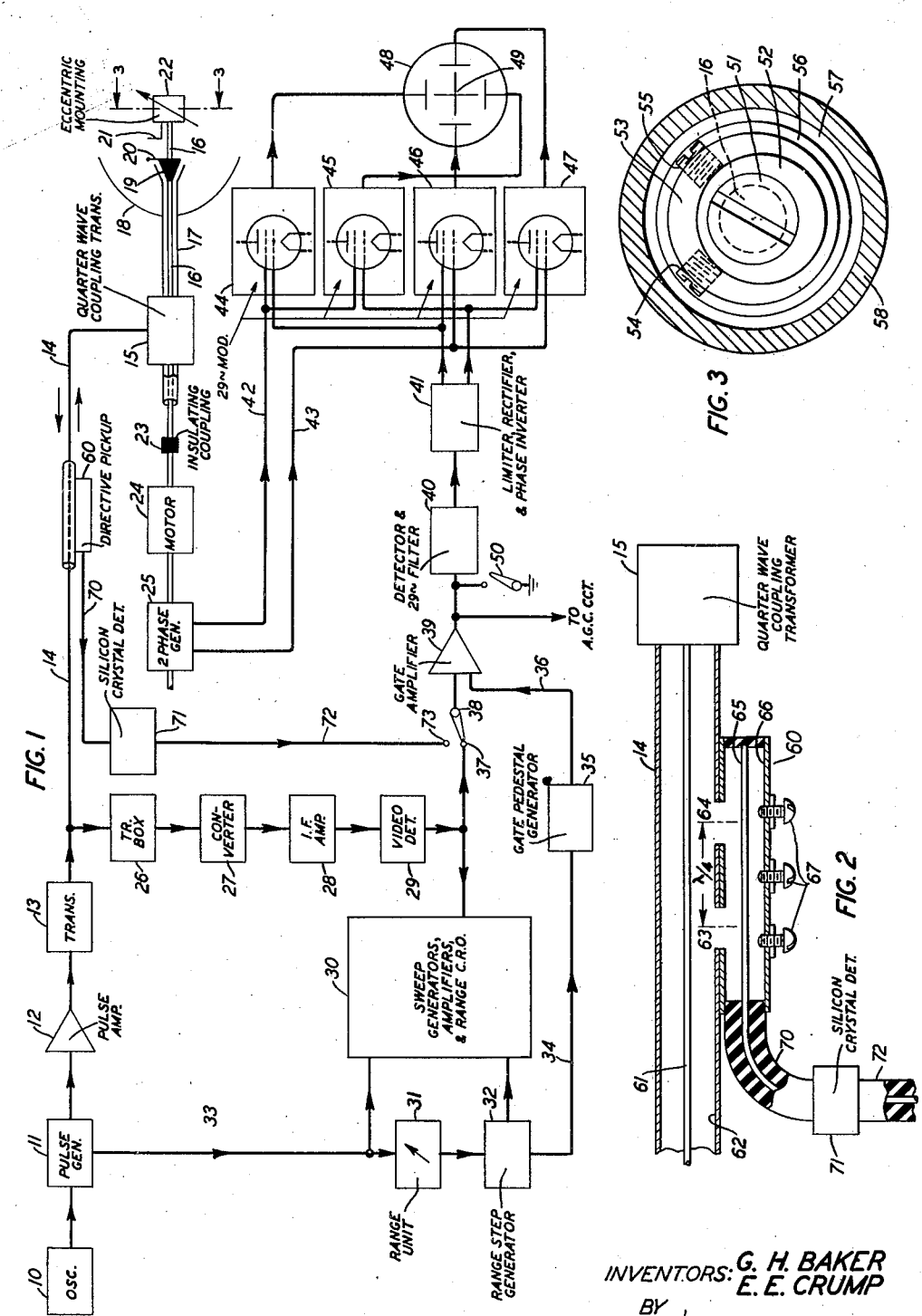

2,500,625

UNITED STATES PATENT OFFICE 2,500,625

SYSTEM FOR MEASURING AND ELIMINATING IMPEDANCE VARIATIONS

George H. Baker and Elmo E. Crump, East Orange, N. J., assignors to Bell Telephone Laboratories, Incorporated, New York, N. Y., a corporation of New York Application June 14, 1946, Serial No. 676,616

4 Claims. (Cl. 250—33.65)

This invention relates to transmission systems and more particularly to testing apparatus and method for use therewith in the measurement of and reduction of variations in the matching of impedances.

When a wave generator is connected to a load circuit by a transmission line, it is generally desirable that the impedance relation throughout the system be carefully matched. A mismatch of the impedances occasions reflection of the transmitted energy from the point of mismatch back to the wave generator source and if the mismatch be of sufficient magnitude it may seriously influence the operating characteristic of the wave generator. In some particular types of systems, frequency or power variations in the wave source may give rise to serious errors in the resulting process.

In its general embodiment the invention proposes a method and system for observing and minimizing the effects of variations in the impedance match between a generator and its connected load.

In direction indicating systems employing amplitude modulations of a reflected signal for the determination of the location of an object in space, a shifting power or frequency output of the wave source may introduce a serious error in the indicated direction. It is an object if this invention to effect a reduction in these errors by making possible more accurate measurements of the variations in the impedance relations and by making possible more accurate adjustments at the boundaries of dissimilar impedance elements.

The invention has a further object to make possible quick and accurate determination of the error introduced into a direction indicating system because of variations in the impedance relation between a wave source and its connected load.

The manner in which these and other objects are accomplished may be more clearly understood from the following description of one preferred embodiment with reference to the accompanying drawing in which:

Fig. 1 shows in block diagrammatic form the general arrangement of a radio energy reflection type object locating system which incorporates the principles of this invention;

Fig. 2 shows in longitudinal cross-section the attachment of the directive pick-up element to the coaxial transmission line; and Fig. 3 shows a cross-sectional end view of the eccentric mounting device used in the reduction of the impedance mismatch.

Apparatus and methods for measuring and matching "steady-state" impedances have long been known in the art. However, in systems in which one of the impedance elements varies in a cyclic manner it may or may not be possible to secure an exact matching of the impedances and therefore it becomes highly desirable to reduce the variations to a minimum and to minimize the effect of these variations.

The copending application of Philip H. Smith, Serial No. 498,622, filed August 14, 1943, discloses a directive antenna system utilizing a rotating semi-dipole antenna element. Our experience with this type of antenna system has disclosed a difficulty that may occasionally arise when it is incorporated into a radio energy reflection type object locating device such, for example, as might be used for anti-aircraft fire control. As will be explained in further detail, this difficulty arises through a variation in the impedance matching of the component elements.

In such a system the horizontal and vertical location of the target object in space is determined through the variations in amplitude of the reflected energy pulses. The object location is portrayed on the screen of a cathode ray tube on which the position of the paraboloidal reflector axis is indicated by the intersection of cross-hairs. The position of the reflected energy object dot with respect to the intersection of the cross-hair denotes the displacement of the target object from a point in space corresponding to a point on the principal axis of the reflector unit. For a more complete explanation of the operation of such a system, reference should be made to the above-mentioned copending application of P. H. Smith and Patent 2,426,182 granted on August 26, 1944 to O. E. DeLange. For the purposes here intended, it is sufficient to point out that if no object is encompassed within the area covered by the transmitted energy beam so as to reflect a portion of that energy, the object dot should coincide with the cross-hair intersection and any factor that under this condition causes a displacement of the dot from this point of coincidence thereby introduces an error that leads to an erroneous direction indication when energy is being returned from a reflecting object.

In using a system such as disclosed in the above applications, we have occasionally experienced this erroneous direction indication and believe it may be caused by cyclic variations in the mismatch of impedances between the wave source and the antenna load device. This mismatch may originate in changes in the antenna element impedance as seen from the wave source during the rotation of the antenna element. Viewed from the wave source end, this changing impedance represents a change in its connected load and tends to "pull," or cause the magnetron oscillator to change, its operating frequency, its power output, or both. As the antenna element is rotating in a cyclic manner, and the impedance mismatch varies in a cyclic manner, the change in the wave source shifts in a like mode and a modulation component, frequency or amplitude, is imparted to the outgoing transmission energy pulse. The reflected portion of this modulated energy pulse appears as an amplitude or a frequency modulated signal to the radar receiving equipment. Because of the characteristic of the band-pass filter organization used in the receiving equipment, to secure suitable discrimination against noise and unwanted signals, the frequency modulated signal may be converted into an amplitude modulated signal. If an amplitude modulation component was imparted to the transmitted energy pulse the reflected pulse will include a like component. Normal operation of the receiving radar equipment is predicated upon the receipt of an amplitude modulated signal, caused by the target object not coinciding with the principal axis of the reflector unit, and if an extraneous amplitude modulation component is introduced into this signal, the location of the target object will be in error by the displacement contributed by this component. It has been our experience that this displacement does occur and that it occurs because of the frequency or power "pull" or modulation of the magnetron oscillator caused by variations in the impedance matching within the system.

The basic cause of variations in the antenna load impedance during the rotational cycle of the antenna element, appears to be the lack of symmetry among the portions of the antenna system. This lack of symmetry arises from irregularities produced during the manufacturing and assembling processes which, though harmful, are within the normal tolerances described for this type of equipment. To attempt to reduce these variations through refined manufacturing procedures appears to involve uneconomical methods. Variations also arise from the necessarily unsymmetrical arrangement of surfaces in effective close proximity to the apparatus when it is used under ordinary operating conditions. Variations of the former type which are fixed in relation to the antenna system, that is, are in a sense inherent in the antenna system, may be compensated. Variations of the latter type which are caused by adjacent surfaces not in fixed relation to the antenna system, such as, for example, as parts of a ship structure, though not compensated by the invention, form a very minor variation and do not materially contribute to the displacement error. This latter type of variation is changed with movement of the antenna system.

To correct these causes of impedance variation without resorting to uneconomical refinements in the mechanical design, our copending application Serial No. 676,393, filed June 13, 1946, now Patent No. 2,492,951, dated January 3, 1950, discloses means for applying a dynamic impedance adjustment as the antenna element is rotated.

In a direction indicating system such as referred to above in which a paraboloidal reflector unit and an antenna element are employed in a moving relationship, the method of determining the required adjustment and the procedure to be followed in applying the adjustment may best be understood with reference to Fig. 1, in which the numeral 10 designates an oscillator that furnishes a sine wave of suitable frequency for synchronizing the pulse generator 11, sometimes referred to as the modulation generator, the pulses of which, after amplification in the pulse amplifier 12, key the radar transmitter 13. The pulses of pulse generator 11 are spaced appropriately to permit the ranging measurements to be made by the system. This generator may be of any of the types well known in the art, for example, any of the numerous "multivibrator" type pulse generating circuits. The generated pulses are approximately one-half micro-second in duration and are square-topped to secure the greatest energy content. Energy pulses produced by the transmitter 13 are supplied to the transmission line 14 for transmission to the quarter-wave coupling transformer 15 which couples the transmitting and receiving equipment to the coaxial line 16, 17 of the antenna system. This coupling and the antenna system generally are explained in greater detail in our copending application referred to. In this antenna system a semi-dipole antenna element 20 is mounted on and connected to the inner conductor 16 of the coaxial line which comprises the outer conductor 17 and passes through the vertex of the paraboloidal reflector 18. The inner conductor 16 is connected to the motor 24 through an insulating coupling 23 and is rotated by the motor 24 at a rate of about 29 revolutions per second. A two-phase generator 25 is mounted on the motor shaft and is driven by the motor 24 to produce a quadrature spaced two-phase output which is supplied to connecting lines 42 and 43 for use in resolving the antenna position at any given instant in its cycle. In order to match the impedance of the semi-dipole antenna element 20 to the comparatively low impedance of the coaxial line comprising inner conductor 16 and outer conductor 17, a series of impedance matching transformer elements (not shown on the drawing) are provided within the coaxial line structure. It will be noted that the antenna element 20 is mounted on the rotating inner conductor 16 through the use of a solid conically shaped mounting unit 19. A rotating reflector unit 21 is provided between the antenna element 20 and the outer end of the rotating conductor 16 where it is supported in its eccentric mounting 22. The eccentric mounting 22, as disclosed and claimed in our copending application referred to, is adjustable and the entire array comprising the coaxial line, after it passes through the vertex of the paraboloidal reflector 18, the conical structure 19, antenna element 20, secondary reflector antenna 21 and the eccentric mounting 22 are housed in a Plexiglas housing (not shown herein). The end of the rotating inner conductor 16 at the right is supported in a bearing which is in turn supported in the eccentric mounting 22. As shown in Fig. 3, which presents an end cross-sectional view of the mounting structure 22, the end of the rotating inner conductor 16 is shown in a dotted circle. Numeral 51 indicates an end cap or plug to cover the end of the rotating shaft. Numeral 52 indicates an eccentric mounting mounted within and enclosed by an outer eccentric mounting 53. Locking set screws 54 and 55 are provided for holding the inner eccentric mounting 52 in fixed relation with the outer eccentric mounting 53. Numeral 56 indicates the eccentric mounting locking nut which is a circular ring threaded into the cylindrical chamber 57, contained in the antenna end casting 58, and holds the outer eccentric mounting 53 in position. By moving the relative positions of the inner and outer eccentric mountings 52 and 53, respectively, it is apparent that the end of the rotating inner conductor 16 may be variously positioned with respect to the mid-point of the cylindrical chamber 57. This operation effectively changes the longitudinal axis of the rotating inner conductor 16 with respect to the inside of the outer coaxial conductor 17 as well as changes the plane of rotation of the antenna element 20 with respect to its adjacent structures. Antenna impedance variations arise from changes in the proximity of the outer surface of the inner rotating conductor 16 and the inner surface of the outer stationary conductor 17 of the coaxial line and in particular from changes in the separation between the outer surface of the conical structure 19 and the inner surface of the outer coaxial conductor 17 which is flared at this point. The flared portion of the outer conductor 17 is one of the factors in the serially connected impedance matching transformer array for conditioning the impedance of the antenna element 20 for matching the impedance of the coaxial line. Variations between these surfaces change the impedance matching relation of the impedance elements and when aided by variations in the mechanical separation between the outer surface of the aforesaid flared conductor portion and the antenna element 20 as well as between the antenna element 20 and the secondary reflector antenna 21, give rise to cyclic variations in the impedance of the antenna system which variations cause modulation of the transmitted energy pulse because of fluctuations in the oscillating frequency or power output of the magnetron oscillator included in the transmitting equipment 13.

Reflected energy, whether derived from an impedance mismatch or from a reflecting object is returned to the T—R box 26 by way of the quarter-wave coupling transformer 15 and the coaxial feed line 14. This T—R unit 26 is a voltage operated device to act as a relay for connecting the receiving equipment during a receiving period and for instantly disconnecting the receiving equipment from the transmitting equipment during a transmitting period to prevent "burn-out" or damage to the receiving equipment during the high energy transmission period. One of several well-known types of this equipment comprises a resonant cavity tuned to the frequency of the transmitted pulses and having a gas-filled two-element vacuum tube connected across points within the cavity of substantially different potentials. When the transmitter is keyed this vacuum tube breaks down under the potential difference existing between the two points to effectively detune the cavity so that the receiver receives very little energy. Upon cessation of the high energy transmitting pulse there is a substantially instantaneous restoration of the gas tube, whereby the receiver input is conditioned to receive the reflected energy. This unit as well as the converter 27, intermediate frequency amplifier 28, video detector 29, sweep generators, amplifiers and range cathode ray oscilloscope 30 constitute part of the normal radar unit and are old elements, the structure and operation of which are well understood in the art.

Pulses from the pulse generator 11 are supplied by way of circuit 33 to the range unit 31, which unit is well known in the art and provides a continuously adjustable phase shift and hence a continuously adjustable time delay factor. In accordance with the invention, the delayed pulses from the range unit 31 actuate the range step generator 32 which supplies by way of circuit 34 a synchronizing pulse to the gate pedestal generator 35. The output of the gate pedestal generator 35 serves to unblock or open the gate amplifier 39 by virtue of its square-topped positive voltage wave delivered over circuit 36. The gate amplifier 39 is so biased that it will accept only echo pulses which are coincident in time with the pedestal pulse. Therefore, in normal operation, the desired reflected pulse is derived from the video detector 29 by way of contact 37 and brush 38 of the switch, as shown, and is superposed on the positive voltage pulse derived from the gate pedestal generator 35 to be passed to the remainder of the circuit. This arrangement provides discrimination for all except the desired pulse. In accordance with the invention, the brush arm 38 is operated to the contact 73, whereby the normal operation of the system is interrupted and the signal input to the gate amplifier is derived over circuit 72 from the silicon crystal detector 71. Crystal detector 71 is excited by energy derived over circuit 70 from the directive pick-up 60. The details of this directive pick-up 60 and the manner in which it is attached to the coaxial line 14 are shown in greater detail in Fig. 2. This pick-up is substantially the same as that disclosed in the copending application of W. W. Mumford, Serial No. 540,252, filed June 14, 1944, and for a detailed description of the operation of this unit reference should be made to that application.

Referring to Fig. 2 it will be noted that two openings 63 and 64, spaced apart by one-quarter wavelength of the operating frequency, are made in the outer conductor 62 of the coaxial line 14 and the outer conductor 66 of the directive pick-up unit 60. When a mismatch of impedances exists standing waves are set up in the transmission line 14 which originate from energy reflected at the point of mismatch back toward the generating source. The total energy in the coaxial line 14 comprises the transmitted energy from the transmitter 13 and the reflected energy traveling in an opposite direction. Energy from the transmitter 13 has two points of entry to the directive pick-up unit 60, one through the opening 63 and another through the opening 64 spaced one-quarter wavelength therefrom. It is apparent that the transmitted energy passing through the opening 64 and received at the silicon crystal detector 71 travels a distance one-half wavelength farther than the transmitted energy entering through opening 63 and received at detector 71. The two distinct energies will therefore be in phase opposition and will mutually cancel. Also, energy reflected from the point of mismatched impedances through the quarter-wave coupling transformer 15 reaches the silicon crystal detector 71 through the openings 63 and 64. The two reflected energies passing through the two openings arrive at the detector 71 in phase agreement since the lengths of the paths traversed by these energies are equal. The amount of the reflected energy received by the silicon crystal detector 71 will, therefore, vary as the impedance mismatch varies during the rotational cycle. The operation of the crystal detector is well known and one of its output components will be equivalent to an 1800-cycle pulse carrier upon which is superposed a 29-cycle amplitude modulation envelope. This corresponds to an antenna rotational speed of 29 revolutions per second and a pulse rate of 1800 pulses per second. This modulated carrier is supplied to the gate amplifier 39 by way of contact 73 and brush arm 38.

By eliminating the delay in the range unit 31 the gate pedestal generator 35 is operated at a time corresponding to the returned reflected energy received from the crystal and, therefore, the gate amplifier 39 is conditioned to accept these pulses. The 1800-cycle pulse carrier with its 29-cycle modulation envelope is passed by the gate amplifier 39 and is fed to two channels one of which, the automatic gain control channel, does not concern us here. The remaining portion of the amplifier output is fed to the detector and filter unit 40 where amplitude modulation, if present, is selected by employing ordinary grid leak detection and ordinary filtering means. This unit passes only frequencies in the immediate vicinity of 29 cycles per second. The output of the detector and filter unit 40 is limited in amplitude by a simple varistor circuit in the limiter rectifier and phase inverter unit 41. In this circuit a portion of the energy is inverted in phase, that is, changed by 180 degrees, by use, for example, of any of the well-known phase inverting vacuum tube circuits whereby from a single voltage input two voltages inverted in phase with respect to each other are derived. The output of unit 41 comprising two 180 degrees displaced voltages is applied to the 29-cycle modulator circuit comprising units 44, 45, 46 and 47. These four units comprise a phase and amplitude sensitive device which combines two 29-cycle voltages, 180 degrees out of phase, with two other 29-cycle voltages, 90 degrees out of phase. The plate circuits of these units are equipped with low-pass condenser, resistor type filters so that average, rather than instantaneous, plate potentials are available for use as deflection voltages for the cathode ray tube 48. One portion of the output of device 41 is supplied to modulator units 44 and 46. The other portion of the output, which is in inverted relation thereto, is supplied to modulator units 45 and 47. The two-phase generator 25 provides an output comprising two 29-cycle sine wave 90 degrees displaced voltages. One of these voltages is supplied by interconnecting circuit 42 to modulators 44 and 45 while the other voltage is supplied by interconnecting circuit 43 to modulator units 46 and 47. Modulator units 44 and 45 control the vertical deflection in the cathode ray tube 48 while modulator units 46 and 47 control the horizontal deflection therein. The center of the cathode ray tube screen is indicated by the intersection of the cross-hairs 49. The excitation for the phase inverter unit 41 is obtained, as previously discussed, from the reflected energy obtained as the impedance of the antenna element 20 varies during its rotation. Resolution of the 90 degrees phase displaced output of the two-phase generator 25 with the 180 degrees phase displaced output of the phase inverter unit 41, indicates the angular position of the antenna element 20 with respect to an arbitrary point of reference at the time of the return of the reflected energy. The 29-cycle modulator units 44 to 47, inclusive, convert this information into voltage components that control the vertical and horizontal deflection on the screen of the cathode ray tube 48.

For a condition of "no signal," the cathode ray tube is focussed so that its spot coincides with the intersection of the cross-hairs 49. For a condition where no amplitude modulation is present on the reflected energy, there would be no voltage supplied by unit 41 and therefore no deflection of the spot on the cathode ray tube screen. This condition would correspond to one where there was no impedance mismatch between the transmitter 13 and the antenna system or where if a mismatch did exist there was no variation of this mismatch during the rotational cycle. Therefore, when a signal is supplied which results in shifting of the spot from the center of the cross-hair intersection, it is evident that amplitude modulation is present in the reflected energy.

Since this fluctuating impedance may so affect the magnetron characteristic that amplitude modulation components, or frequency shifts capable of reduction to amplitude components, are imparted to the energy pulse and hence to the reflected pulse it is clear that a shift of the radar dot on the cathode ray tube screen may be superimposed on the deflection normally produced by energy returned from a target object. If this error is the result of frequency variations, its magnitude will be affected by the tuning of the receiving equipment.

To eliminate this impedance variation, suitable adjustment is made in the axis of rotation of the inner conductor 16 and the antenna semi-dipole element 20. The antenna housing (not shown) for the bearing and eccentric mounting assembly is removed and the locking ring 56 (Fig. 3) is loosened as are locking set screws 54 and 55, this double eccentric bearing being shown more fully in our copending application referred to. The equipment is turned on and the antenna element 20 is rotated at its normal speed, with switch arm 38 and contact 73 engaged. Initially, the output of the gate amplifier 39 is grounded through the switch 50 so that no reflected signal is applied to the detector filter unit 40. Under these conditions the object dot should coincide with the intersection of the cross-hairs 49. The reflected signal is then passed to the detector filter unit by restoring switch 50 to the unoperated position and any shifting of the object dot may be observed on the cathode ray tube screen. The eccentric units 52 and 53 are then adjusted as follows. Using small rods which fit holes in the eccentric units, hold one in its existing position and rotate the other to a directly opposite position. Visualize a straight line passing through the "off-center" position of the object dot and the center of the cross-hair intersection as observed on the screen of the cathode ray tube 48. Keeping the direction of this imaginary line in mind rotate both eccentrics as a unit until the two handles make a line which would be approximately perpendicular to this imaginary line. Now, if both handles are rotated through the same angle but in opposite directions the object dot should move along the straight line either toward or away from the center. Proper adjustment of the eccentric unit to center the dot will have to be determined by trial while observing the shifting of the spot on the cathode ray tube screen. For any stationary position of the antenna system, when no reflected energy is being returned from an extraneous object, it should be possible to make the object dot substantially coincide with the center of the crosshair intersection. This operation so positions the axis of rotation of the inner rotating conductor 16 and the antenna element 20 that variations in the separations between the surfaces of these units and adjacent surfaces during the rotational cycle are effectively counter-balanced and no net impedance variation occurs during the cycle. As previously mentioned, it should be borne in mind that some slight and inconsequential variation may be introduced from surrounding structures when the antenna position is shifted from that which it occupied during the adjustment period. Locking set screws 54 and 55 are now tightened to position the eccentric units 52 and 53 in their final positions and locking ring 56 is tightened to retain the outer eccentric unit 53 in its final position. Return of the switch arm 38 to the contact 37 restores the unit for normal operation.

Although the above embodiment shows the invention as incorporated in a radio energy reflecting device used for object location, it should be appreciated that its scope should not be so limited. Other applications within the scope of this invention will doubtlessly occur to those skilled in the art.

What is claimed is:

1. A method of eliminating, in a system comprising an impedance element connected to a source of energy and rotating about a given axis, the impedance variation of said element produced during rotation of the element, which comprises extracting from said system a current having an amplitude and phase representing the cyclic variation in impedance of said element during its rotation, determining the amplitude and phase of said current, and shifting said axis of rotation an amount dependent upon said amplitude and in a direction dependent upon said phase.

2. A method, in a system comprising a coaxial line connected to a transmitter and comprising a stationary outer conductor and a rotating inner conductor, a linear antenna element attached to the end of said inner conductor, of eliminating a variation in the impedance of said element produced during its rotation, utilizing a source of reference voltage and means for shifting the axis of rotation of said element and inner conductor, which comprises selecting the energy reflected by said element, detecting from said reflected energy a component having a phase and amplitude representing said impedance variation, comparing said component with said reference voltage to determine the phase and amplitude variation thereof, and shifting the axis of rotation of said element and inner conductor relative to said stationary outer conductor an amount dependent upon the phase and amplitude of said component.

3. In a system comprising a rotating impedance element, a source of reference voltages, a source of energy, a transmission line connecting said source to said rotating impedance element, said transmission line comprising a coaxial line having a stationary outer conductor and a rotating inner conductor attached to said impedance element, a method of measuring and eliminating the variations in the impedance of said rotating impedance element which comprises selecting the energy reflected by said rotating impedance element, detecting from said selected energy an amplitude modulated energy wave corresponding to said variations, comparing said detected energy with said reference voltages to determine the phase and amplitude variations thereof, and shifting the axis of rotation of said inner conductor relative to said outer conductor an amount and in a direction dependent upon the amplitude and phase of said variations.

4. In a radio direction indicating system, a source of radio energy, a stationary parabolic reflector, a linear antenna element positioned in front of said reflector, a coaxial line extending through the vertex of said reflector and comprising a rotating inner conductor connected to said element and a stationary outer conductor, means connected to said line and comprising a directive pick-up and an indicator for ascertaining and evaluating any variation in the impedance of said element produced during its rotation, and means for compensating for said variation, said means comprising a double eccentric bearing supporting said inner conductor for adjusting the position of said rotating inner conductor and associated rotating element relative to said stationary outer conductor.

GEORGE H. BAKER.
ELMO E. CRUMP.

REFERENCES CITED

The following references are of record in the file of this patent:

UNITED STATES PATENTS

| Number | Name | Date |
|---|---|---|
| 1,853,953 | Becker | Apr. 12, 1932 |
| 2,256,787 | Lazar | Sept. 23, 1941 |
| 2,403,562 | Smith | July 9, 1946 |
| 2,412,612 | Godet | Dec. 17, 1946 |
| 2,417,248 | Godet | Mar. 11, 1947 |
| 2,423,390 | Korman | July 1, 1947 |
| 2,424,193 | Rost et al. | July 15, 1947 |
| 2,446,024 | Porter et al. | July 27, 1948 |